United States Patent
Takeyama

(10) Patent No.: US 9,438,061 B2
(45) Date of Patent: Sep. 6, 2016

(54) CONTROLLING CHARGING CURRENT SUPPLIED TO PLURALITY OF CELL MODULES CONNECTED IN PARALLEL

(71) Applicant: MITSUBISHI HEAVY INDUSTRIES, LTD., Tokyo (JP)

(72) Inventor: Akira Takeyama, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 97 days.

(21) Appl. No.: 14/086,306

(22) Filed: Nov. 21, 2013

(65) Prior Publication Data

US 2014/0159666 A1     Jun. 12, 2014

(30) Foreign Application Priority Data

Dec. 11, 2012   (JP) ................. 2012-270616

(51) Int. Cl.
*H02J 7/00*        (2006.01)

(52) U.S. Cl.
CPC ............ *H02J 7/0077* (2013.01); *H02J 7/0013* (2013.01); *Y02E 70/40* (2013.01)

(58) Field of Classification Search
CPC ...... H02J 7/0013; H02J 7/0077; Y02E 70/40
See application file for complete search history.

(56) References Cited

U.S. PATENT DOCUMENTS

| | | | | |
|---|---|---|---|---|
| 3,740,636 A | * | 6/1973 | Hogrefe et al. | 320/101 |
| 4,673,826 A | * | 6/1987 | Masson | 307/66 |
| 5,179,335 A | * | 1/1993 | Nor | 320/159 |
| 5,442,274 A | * | 8/1995 | Tamai | 320/146 |
| 5,801,514 A | * | 9/1998 | Saeki et al. | 320/136 |
| 5,998,969 A | * | 12/1999 | Tsuji et al. | 320/132 |
| 6,274,950 B1 | * | 8/2001 | Gottlieb et al. | 307/66 |
| 6,452,364 B1 | * | 9/2002 | Saeki et al. | 320/137 |
| 6,687,103 B2 | * | 2/2004 | Pannwitz | 361/90 |
| 6,762,587 B1 | * | 7/2004 | Barbetta | 320/116 |
| 7,064,521 B2 | * | 6/2006 | Stanesti et al. | 320/126 |
| 7,378,819 B2 | * | 5/2008 | Wang et al. | 320/121 |

(Continued)

FOREIGN PATENT DOCUMENTS

| | | |
|---|---|---|
| CN | 102480142 | 5/2012 |
| CN | 102480142 A | 5/2012 |

(Continued)

OTHER PUBLICATIONS

Japanese Office Action dated Oct. 21, 2014, issued in corresponding JP application No. 2012-270616 with English translation (8 pages).

(Continued)

*Primary Examiner* — Naum B Levin
(74) *Attorney, Agent, or Firm* — Westerman, Hattori, Daniels & Adrian, LLP

(57) ABSTRACT

Even when current values of a current that flows to a plurality of cell modules connected in parallel are different, efficient charging is performed. A charge control device that controls a charging current to be supplied to a plurality of cell modules connected in parallel compares a maximum current value, selected from current values detected by a current sensor provided in each of a plurality of the cell modules, with a reference current value predetermined as a maximum current value of the current to be supplied to secondary batteries, and controls the charging current to be supplied to a plurality of the cell modules based on a comparison result.

8 Claims, 4 Drawing Sheets

(56) References Cited

U.S. PATENT DOCUMENTS

| | | | |
|---|---|---|---|
| 7,391,184 B2* | 6/2008 | Luo et al. | 320/137 |
| 7,394,225 B2* | 7/2008 | Guang et al. | 320/158 |
| 7,533,746 B2* | 5/2009 | Yamaguchi | 180/65.29 |
| 7,612,540 B2* | 11/2009 | Singh | 320/162 |
| 8,022,670 B2* | 9/2011 | Chen et al. | 320/126 |
| 8,310,094 B2* | 11/2012 | Yamada et al. | 307/46 |
| 8,583,389 B2* | 11/2013 | Aoshima et al. | 702/63 |
| 8,704,405 B2* | 4/2014 | Deng et al. | 307/71 |
| 8,803,481 B2* | 8/2014 | Tachikawa et al. | 320/134 |
| 8,829,857 B2* | 9/2014 | Minamiura | 320/136 |
| 9,007,025 B2* | 4/2015 | Miller et al. | 320/126 |
| 2001/0010456 A1* | 8/2001 | Kaite et al. | 320/125 |
| 2003/0087147 A1 | 5/2003 | Minamiura | |
| 2009/0302681 A1* | 12/2009 | Yamada et al. | 307/46 |
| 2010/0104929 A1* | 4/2010 | Schafer et al. | 429/90 |
| 2010/0136390 A1* | 6/2010 | Ueda et al. | 429/61 |
| 2010/0176764 A1* | 7/2010 | Tachikawa et al. | 320/118 |
| 2010/0217552 A1* | 8/2010 | Hsu et al. | 702/63 |
| 2011/0148361 A1* | 6/2011 | Yokotani | 320/136 |
| 2011/0155703 A1* | 6/2011 | Winn | 219/121.54 |
| 2011/0181249 A1* | 7/2011 | Deguchi et al. | 320/149 |
| 2011/0234006 A1* | 9/2011 | Deng et al. | 307/71 |
| 2011/0248681 A1* | 10/2011 | Miller et al. | 320/126 |
| 2012/0091966 A1* | 4/2012 | Mori | 320/134 |
| 2012/0153899 A1* | 6/2012 | Marschalkowski et al. | 320/118 |
| 2013/0113417 A1* | 5/2013 | Nakashima | 320/107 |

FOREIGN PATENT DOCUMENTS

| | | |
|---|---|---|
| JP | 04-281339 A | 10/1992 |
| JP | 08-182213 A | 7/1996 |
| JP | 2003-142165 A | 5/2003 |
| JP | 2006-101699 A | 4/2006 |
| JP | 2008-220104 A | 9/2008 |

OTHER PUBLICATIONS

Office Action dated Jul. 10, 2015, issued in counterpart Chinese Patent Application No. 201310664864.9, with English translation (18 pages).

Japanese Office Action dated Oct. 21, 2014, issued in counterpart JP Patent Application No. 2012-270616 with English translation (8 pages).

Decision to Grant a Patent dated Jan. 20, 2015, issued in counterpart JP Patent Application No. 2012-270616 with English transiation; Explanation of Relevance: "The Decision to Grant a Patent has been received." (6 pages).

Chinese Office Action dated Jul. 10, 2015, issued in counterpart Chinese Patent Application No. 201310664864.9, with English translation (18 pages).

* cited by examiner

CONTROLLING CHARGING CURRENT SUPPLIED TO PLURALITY OF CELL MODULES CONNECTED IN PARALLEL

CROSS-REFERENCE TO RELATED APPLICATIONS

This application is based on Japanese Patent Application No. 2012-270616, the contents of which are incorporated herein by reference.

TECHNICAL FIELD

The present invention relates to a charge control device, a cell system, and a charge control method.

BACKGROUND ART

A cell system which includes a plurality of chargeable and dischargeable cell modules connected in parallel has been known. This cell system is adapted to charge electric power, from power sources that use natural energy, such as wind power generators and solar power generators, and electric power from commercial power sources, to the cell modules via a power conversion system such as an inverter and a converter.

Disclosed in PTL 1 is one example of a method for charging a plurality of cell modules connected in parallel, in which constant current control is started upon output of a specified constant current from a power source and, once the cell modules are sufficiently charged with the constant current and a current inflow to the cell modules decreases, the constant current charging is shifted to constant voltage charging.

CITATION LIST

Patent Literature

{PTL 1}
Japanese Unexamined Patent Application, Publication No. 2008-220104

SUMMARY OF INVENTION

Technical Problem

Here, due to such factors as difference in internal resistance values between the cell modules, values of a charging current that flows into each of the cell modules may vary.

Accordingly, in conventional charging methods as disclosed in PTL 1 which do not take variation in the charging current values into consideration, cells and modules may be charged with an excessive current beyond a maximum allowable charging current value. Moreover, in charging methods in consideration of variation in the charging current values, charging is performed with a charging current having a sufficient margin set with respect to the maximum charging current value, which results in inability of efficient charging.

The present invention has been invented in view of such circumstances, and an object of the present invention is to provide a charge control device, a cell system, and a charge control method capable of performing efficient charging even when current values of a current flowing to a plurality of cell modules connected in parallel are different.

Solution to Problem

In order to solve the above stated problem, a charge control device, a cell system, and a charge control method of the present invention adopt the following solution.

A charge control device according to a first aspect of the present invention is a charge control device that controls a charging current to be supplied to a plurality of chargeable and dischargeable cell modules connected in parallel, wherein a maximum current value, selected from current values detected by a current detection means provided in each of a plurality of the cell modules, is compared with a reference current value predetermined as a maximum current value of the current to be supplied to the cell modules, and based on a comparison result, the charging current to be supplied to a plurality of the cell modules is controlled.

The charge control device according to the present configuration controls the charging current to be supplied to a plurality of chargeable and dischargeable cell modules connected in parallel. Note that a cell module may include a plurality of secondary batteries connected in series, or include one secondary battery.

Current values of the current, flowing at the time of charging a plurality of the cell modules connected in parallel, may vary due to difference in internal resistance values and the like between the cell modules.

Accordingly, a maximum current value selected from the current values detected by the current detection means provided for each of a plurality of the cell modules is compared, by the charge control device, with a reference current value predetermined as a maximum current value of the current to be supplied to the cell modules. Among a plurality of the cell modules, a cell module having the maximum current value can be charged faster than other cell modules and is also highly likely to be charged with an excessive current when the charging current is increased. Accordingly, it is necessary to determine a charging current value based on the maximum current value and the reference current value.

Based on the comparison result between the maximum current value and the reference current value, the charging current to be supplied to a plurality of the cell modules is controlled. For example, when the maximum current value is less than the reference current value, the charge control device increases the charging current. Contrary to this, when the maximum current value exceeds the reference current value, the charge control device decreases the charging current. Note that control of the charging current by the charge control device is in actuality to increase or decrease a charging current command value so as to control the charging current to be supplied from the power source.

Therefore, with the present configuration, an optimum charging current may be determined in consideration of the current values of the current that flows to each cell module. Accordingly, even when the values of the current that flows to a plurality of the cell modules connected in parallel are different, efficient charging can be performed.

According to the first aspect, it is preferable that when the maximum current value is less than the reference current value, the charging current is increased, whereas when the maximum current value exceeds the reference current value, the charging current is decreased.

According to the present configuration, the charging current is increased or decreased in stages, which makes it possible to cope with a change in the current values attributed to cell voltage values, internal resistance, and the like at the time of charging.

According to the first aspect, it is preferable that when at least one voltage value, detected by a voltage detection means that detects a voltage in each of secondary batteries that constitute the cell modules, has reached a predetermined first upper limit, the charging current to be supplied to the cell modules is controlled so that a maximum voltage value detected by the voltage detection means does not exceed a predetermined second upper limit.

According to the present configuration, since constant voltage charging is performed depending on the maximum voltage value of the secondary batteries that constitute the cell modules, the secondary batteries can be charged closer to full charge.

According to the first aspect, it is preferable that charging of the cell modules is ended based on the current values detected by the current detection means.

For example, if charging of the cell modules is ended when a minimum current value becomes equal to or less than the predetermined lower limit, overcharge or unnecessarily high SOC (State of Charge) is further prevented. If charging of the cell modules are ended when the maximum current value becomes equal to or less than the predetermined lower limit, generation of a reflux current (a current that flows from a cell module of high voltage to a cell module of low voltage) is suppressed. If charging of the cell modules is ended when a difference between the maximum current value and the minimum current value becomes equal to or less than a specified value, generation of the reflux current is further suppressed.

Thus, according to the present configuration, charging is ended based on the values of the current that flows to the cell modules, so that the cell modules can be used more safely.

According to the first aspect, it is preferable that a plurality of the current detection means are provided in different positions for each of the cell modules, and the presence or absence of abnormality is determined based on a difference in detection results by a plurality of the current detection means provided for each of the cell modules.

According to the present configuration, it becomes possible to easily determine the presence or absence of abnormality in the cell modules, the current detection means provided for the cell modules, and the like.

According to the first aspect, it is preferable that the presence or absence of abnormality is determined based on a difference in detection results in each of the cell modules detected by the current detection means.

According to the present configuration, it becomes possible to easily determine the presence or absence of abnormality in the cell modules, the current detection means provided for the cell modules, and the like.

A cell system according to a second aspect of the present invention includes: a plurality of chargeable and dischargeable cell modules connected in parallel; a power source that supplies a charging current to a plurality of the cell modules; a plurality of current detection means that detect the current in each of a plurality of the cell modules; and the aforementioned charge control device.

A charge control method according to a third aspect of the present invention is a charge control method for controlling a charging current that is supplied to a plurality of chargeable and dischargeable cell modules connected in parallel, including: a first step of comparing a maximum current value, selected from current values detected by a current detection means in each of a plurality of the cell modules, with a reference current value predetermined as a maximum current value of the current to be supplied to the cell modules; and a second step of controlling the charging current to be supplied to a plurality of the cell modules based on a comparison result of the first step.

Advantageous Effects of Invention

The present invention has an excellent effect of being able to perform efficient charging even when current values of the current that flows to a plurality of the cell modules connected in parallel are different.

DESCRIPTION OF EMBODIMENTS

Embodiments of a charge control device, a cell system, and a charge control method according to the present invention are described hereinbelow with reference to the drawings.

First Embodiment

Now, a first embodiment of the present invention is described.

Figure 1:
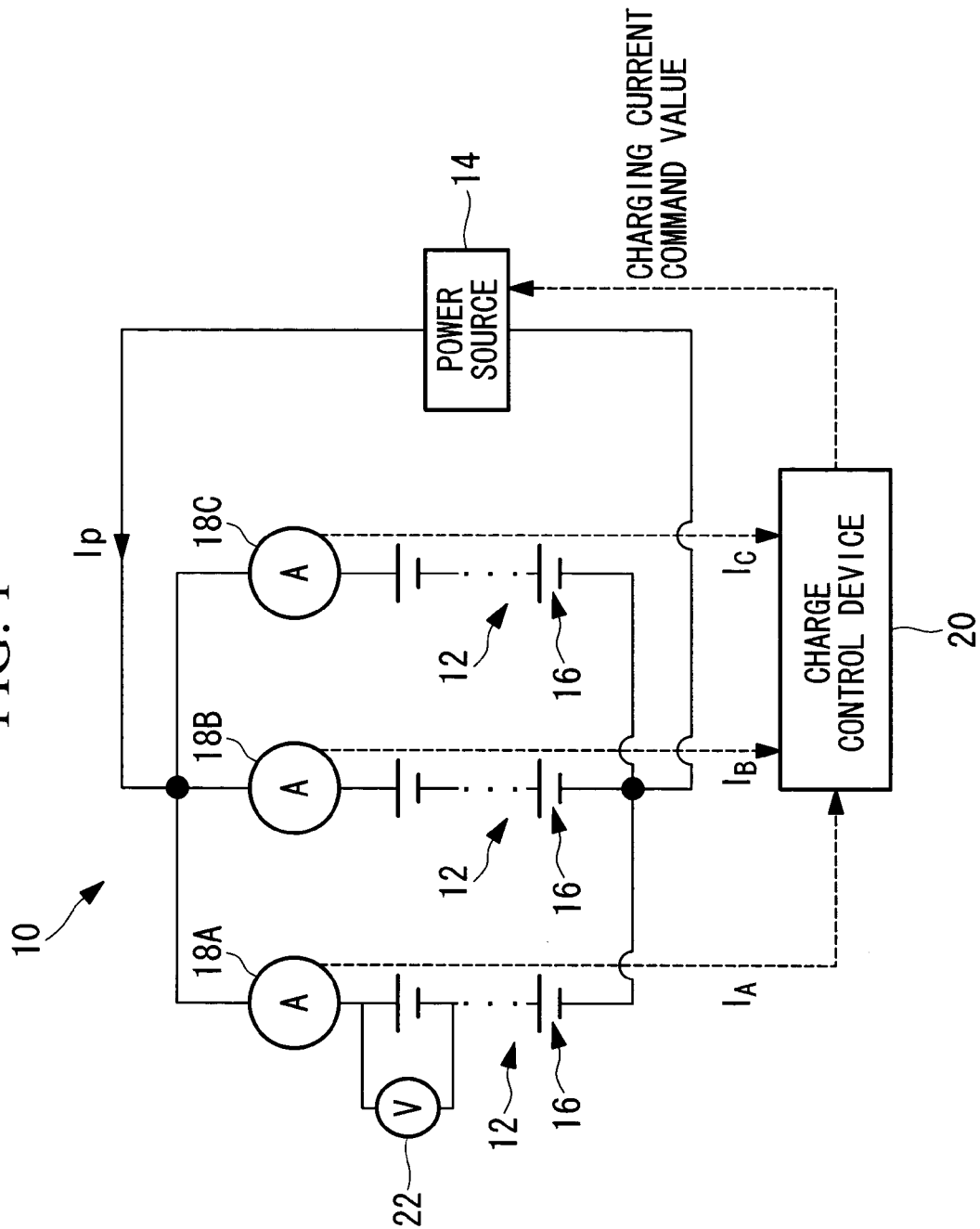
FIG. 1 is a block diagram of a cell system according to a first embodiment of the present invention.

FIG. 1 is a block diagram of a cell system 10 according to the first embodiment of the present invention. Note that in FIG. 1, a load connected to the cell system 10 is omitted.

In the cell system 10, a plurality of chargeable and dischargeable cell modules 12 are connected in parallel to a power source 14. The cell module 12 is an assembled battery in which a plurality of secondary batteries 16 are connected in series so as to constitute one arm.

Although the secondary battery 16 according to the present first embodiment is a lithium-ion secondary battery as one example, the present invention is not limited to the configuration. The cell module 12 may also be one secondary battery 16.

The power source 14 supplies a charging current to each of the cell modules 12. The power source 14 includes, for example, an AC/DC converter to convert alternating current power supplied from a commercial power source into a direct current, and supplies the direct current to each of the cell modules 12.

Further, the cell system 10 includes current sensors 18A to 18C that detect the current flowing to each of the cell modules 12, and a charge control device 20 that controls the charging current to be supplied to each of the cell modules 12.

The current sensors (current detection means) 18A to 18C detect current values of the current that flows to each of the corresponding cell modules 12 at each fixed time, and output detected current values to the charge control device 20. In the following description, when the current sensors 18A to 18C are individually specified, any one of reference characters A to C is appended to the end of each reference numerals, whereas when each of the current sensors 18A to 18C is comprehensively referred, the reference characters A to C are omitted.

The charge control device 20 compares a maximum current value, selected from the current values detected in each of a plurality of the cell modules 12, with a reference current value predetermined as a maximum current value of the current to be supplied to the cell modules 12, and controls, based on a comparison result, a charging current command value used as a basis of the charging current to be supplied to a plurality of the cell modules 12. Based on the charging current command value, the power source 14 performs current control. Note that the reference current value is, for example, a value with a tolerance added to the maximum current value of the charging current to be supplied to the secondary batteries 16.

Note that the charge control device 20 is formed from, for example, a CPU (Central Processing Unit), a RAM (Random Access Memory), a computer-readable recording medium, and the like. In one example, a series of processes for implementing various functions of the charge control device 20 are recorded on a recording medium and the like in the form of a program, and when the CPU executes the program for arithmetic processing, these various functions are implemented.

Moreover, the cell system 10 includes a voltage sensor (voltage detection means) 22 in each of the secondary batteries 16 to detect the voltage of each of the second batteries 16. Voltage values (hereinafter referred to as "cell voltage values") detected by the voltage sensors 22 are outputted to the charge control device 20. Note that in FIG. 1, only one secondary battery 16 is illustrated to have the voltage sensor 22 and the voltage sensors 22 provided for other secondary batteries 16 are omitted.

Figure 2:
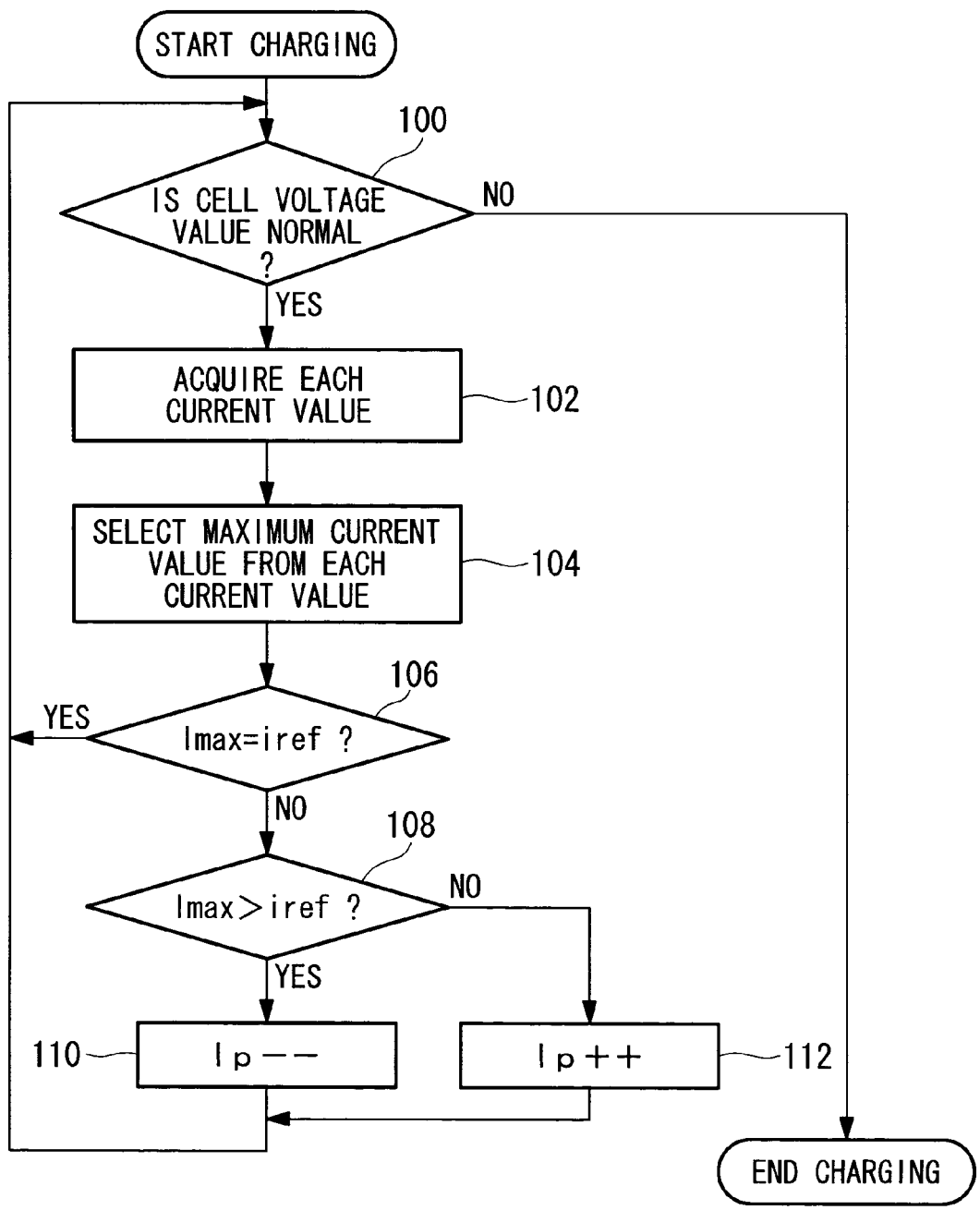
FIG. 2 is a flowchart showing a flow of charge control processing according to the first embodiment of the present invention.

FIG. 2 is a flowchart showing a flow of charge control processing (charge control program) executed in the charge control device 20 according to the first embodiment, in which the charge control processing is started at the moment when charging of the cell modules 12 is started. Note that the charge control program is prestored in a specified region of a memory means (such as a RAM) included in the charge control device 20.

First, in step 100, it is determined whether or not a cell voltage value of each of the secondary batteries 16 that constitute the cell modules 12 is equal to or less than a specified value. Based on the determination, it is determined in step 100 whether or not the cell voltage value is normal. If the result is yes, the processing shifts to step 102, whereas if the result is no, the charge control processing is ended. The determination in step 100 is, in other words, to determine overcharge of the secondary batteries 16. If the cell voltage value is larger than the specified value, overcharge is determined, i.e., further charging is determined to be unnecessary. Contrary to this, if the cell voltage value is less than or equal to the specified value, it is determined that charging can be performed.

In step 102, current values detected in each of a plurality of the cell modules 12 are acquired from the current sensors 18.

In next step 104, a maximum current value is selected from current values $I_A$, $I_B$, and $I_C$ which were detected in each of a plurality of the cell modules 12.

Current values of the current, flowing at the time of charging to a plurality of the cell modules 12 connected in parallel, may vary due to difference in internal resistance values and the like between the cell modules.

For example, when the power source 14 supplies a charging current Ip=240A to a plurality of the cell modules 12 connected in parallel, and 90A as a current value $I_A$, 70A as a current value $I_B$, and 80A as a current value $I_C$ are detected, 90A detected by the current sensor 18A is selected as the maximum current value in step 104.

Among a plurality of the cell modules 12, a cell module 12 to which the current of the maximum current value is flowing can be charged faster than other cell modules 12 and is also highly likely to be charged with an excessive current when the charging current Ip is increased. Accordingly, it is necessary to determine a charging current value based on the maximum current value and the reference current value.

In next step 106, it is determined whether or not a maximum current value Imax is equal to a reference current value Iref (e.g., 100A). If the result is yes, the processing shifts to step 100, whereas if the result is no, the processing shifts to step 108.

In next step 108, it is determined whether or not the maximum current value Imax is larger than the reference current value Iref. If the result is yes, the processing shifts to step 110, whereas if the result is no, the processing shifts to step 112.

In step 110, the power source 14 is controlled by outputting a charging current command value so as to decrease the charging current Ip by a first specified value, and the processing returns to step 100.

In step 112, the power source 14 is controlled by outputting a charging current command value so as to increase the charging current Ip by a second specified value, and the processing returns to step 100.

In steps 106 to 112, if it is assumed, for example, that the charging current Ip is 240A, the maximum current value Imax is 90A that is detected by the current sensor 18A, and the reference current value Iref is 100A as mentioned above, the charge control processing shifts from step 108 to step 112 since the maximum current value Imax is lower than the reference current value Iref. Then, in step 112, the charging current Ip is increased by the first specified value (e.g., 10A) to 250A, and the processing shifts to step 100. By repeating these processes, the maximum current value Imax can eventually be approximated to the reference current value Iref. In the past, each of the cell modules 12 connected in parallel has been charged with a charging current that had a sufficient margin with respect to the upper limit (maximum charging current value) so as to be feedable to each of the cell modules 12. However, according to the first embodiment, it becomes possible to perform more nearly optimum and more efficient charging with due consideration to the charging current that flows to the cell modules 12 that are currently in use.

As shown in steps 110 and 112, the charging current Ip is increased or decreased in stages. Thus, increasing or decreasing the charging current Ip in stages makes it possible to cope with a change in the maximum current value attributed to cell voltage values, internal resistance, and the like, at the time of charging. Moreover, in the charge control processing, setting a charge control cycle shorter and setting the first specified value and the second specified value smaller make it easier to match the maximum current value Imax with the reference current value Iref. It is to be noted that the charge control processing according to the first embodiment is not limited to the case of increasing or decreasing the charging current command value by increasing or decreasing the charging current Ip with use of fixed values, such as the preset first specified value and the second specified value, but an increasing/decreasing width of the charging current command value may be changed by using feedback control, such as PID (Proportional Integral Derivative) control and PI (Proportional Integral) control, depending on a difference between the reference current value and the maximum current value.

Note that in the charge control processing according to the first embodiment, the first specified value and the second specified value are made into the same value. Without being limited thereto, the first specified value may be made into a value different from the second specified value.

As described in the foregoing, the charge control device 20 according to the first embodiment compares a maximum current value, selected from current values detected by the current sensor 18 provided for each of a plurality of the cell modules 12, with a reference current value predetermined as a maximum current value of the current to be supplied to the secondary batteries 16, and controls the charging current to be supplied to a plurality of the cell modules 12 based on a comparison result.

Thus, the charge control device 20 determines an optimum charging current in consideration of the current values of the current that flows to each of the cell modules 12, and therefore even when current values of the current that flows to a plurality of the cell modules 12 connected in parallel are different, efficient charging can be performed.

Second Embodiment

Hereinafter, a second embodiment of the present invention is described.

Since a cell system 10 according to the second embodiment is similar in configuration to the cell system 10 according to the first embodiment shown in FIG. 1, a description thereof is omitted. Note that a secondary battery 16 according to the second embodiment is like a lithium ion battery that can be charged by constant current charging and constant voltage charging.

In the cell system 10 according to the second embodiment, when at least one cell voltage value detected by a voltage sensor 22 reaches a predetermined first upper limit (hereinafter simply referred to as an "upper limit"), a charging current to be supplied to cell modules 12 is controlled so that a maximum cell voltage value does not exceed a predetermined second upper limit (hereinafter referred to as an "upper limit voltage value").

Figure 3:
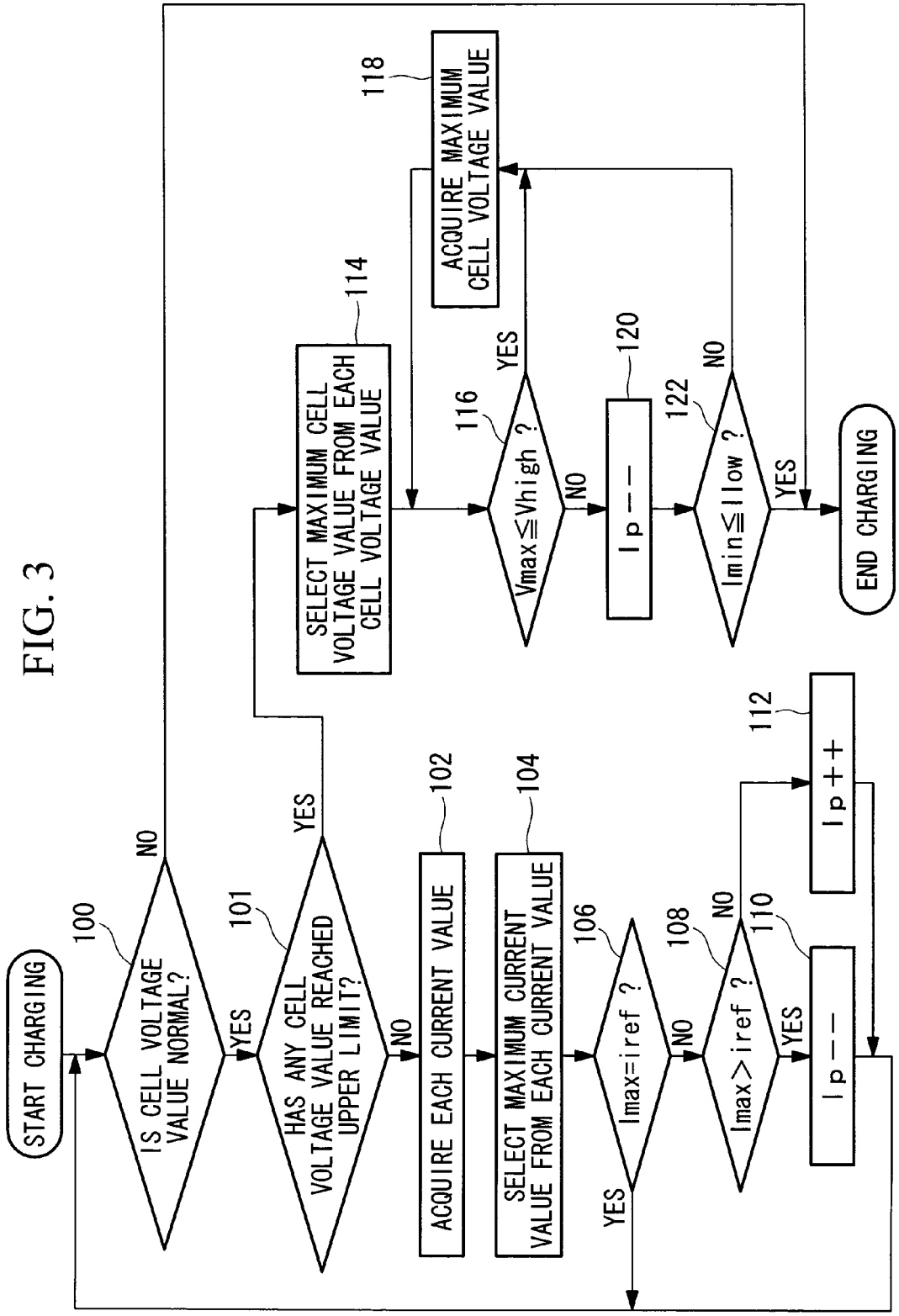
FIG. 3 is a flowchart showing a flow of charge control processing according to a second embodiment of the present invention.

FIG. 3 is a flowchart showing a flow of charge control processing (charge control program) according to the second embodiment. Note that the steps in FIG. 3 identical to those in FIG. 2 are designated by identical reference numerals to omit a part or all of the description thereof.

First, when a cell voltage is determined to be normal in step 100, the processing shifts to step 101.

In step 101, it is determined whether or not any cell voltage value has reached the upper limit. If the result is yes, then the processing shifts to step 114, whereas if the result is no, the processing shifts to step 102. The upper limit is a value for determining that the secondary battery 16 is close to full charge. When the cell voltage value does not yet reach the upper limit, the processing shifts to step 102 to perform constant current charging, whereas when the cell voltage value does reach the upper limit, the processing shifts to step 114 to perform constant voltage charging.

In step 114, a maximum cell voltage value Vmax is selected from a plurality of detected cell voltage values. The charge control processing is implemented by performing constant voltage charging on the basis of the maximum cell voltage value Vmax.

In next step 116, it is determined whether or not the maximum cell voltage value Vmax is equal to or less than an upper limit voltage value Vhigh. If the result is yes, the processing shifts to step 118, whereas if the result is no, i.e., the maximum cell voltage value Vmax exceeds the upper limit voltage value Vhigh, the processing shifts to step 120.

In step 118, a detection result by the voltage sensor 22 that acquired the maximum cell voltage value Vmax is reacquired to update the maximum cell voltage value Vmax, and constant voltage charging is continued based on the update result, before the processing returns to step 116.

In step 120, the power source 14 is controlled so as to decrease a charging current Ip by a specified value.

In next step 122, it is determined whether or not a minimum current value Imin, among current values detected by the current sensor 18, is equal to or less than a predetermined lower limit current value Ilow. If the result is no, the processing returns to step 118, so that the maximum cell voltage value Vmax is reacquired, and constant voltage charging is continued. If the result is yes, charging of the cell modules 12 is ended.

When the minimum current value Imin becomes equal to or less than the predetermined lower limit, the charge control processing ends charging of the cell modules 12, so that safer charging can be implemented. Safe charging is defined as charging that further prevents overcharge or unnecessarily high SOC (State of Charge).

Thus, the cell system 10 according to the second embodiment performs constant voltage charging depending on the maximum voltage of the secondary batteries 16 that constitute the cell modules 12, so that the secondary batteries 16 can be charged deeper, i.e., charged close to full charge.

Although in the charge control processing according to the second embodiment, a description has been given of the configuration in which charging of the cell modules 12 is ended when the minimum current value Imin becomes equal to or less than the predetermined lower limit, the present invention is not limited to the configuration described. In the charge control processing according to the second embodiment, charging of the cell modules 12 may be ended when, for example, the maximum current value Imax becomes equal to or less than the specified lower limit current value Ilow, or when a difference between the maximum current value Imax and the minimum current value Imin becomes equal to or less than a specified value.

When the maximum current value Imax becomes equal to or less than the lower limit current value Ilow, the charge control processing ends charging of the cell modules 12, so that generation of a reflux current is suppressed. The reflux current is generated due to an electric potential difference (difference in electromotive force) between the secondary batteries 16 after the end of charging. By using the maximum current value Imax as reference, a current larger than the maximum current value Imax is prevented from flowing to the secondary batteries 16. This makes it possible to suppress increase in the current difference and to suppress generation of the reflux current.

When a difference between the maximum current value Imax and the minimum current value Imin becomes equal to or less than a specified value, the charge control processing ends charging of the cell modules 12 and thereby the current difference between the secondary batteries 16 becomes smaller, so that generation of the reflux current is further suppressed.

Thus, according to the charge control processing according to the second embodiment, charging is ended based on the values of the current that flows to the cell modules 12, so that the cell modules 12 can be used more safely.

Further, in the charge control processing according to the second embodiment, a description has been given of the configuration in which the processing shifts to step 118 when the result is yes in step 116 and when the result is no in step 122. However, the present invention is not limited to the configuration described, and it is also possible to adopt the configuration in which the processing shifts to step 114 when the result is yes in step 116 and when the result is no in step 122. In the case of this configuration, constant voltage charging is performed with the maximum cell voltage value being selected on a constant basis, which makes it possible to perform deep charging with more reliability and safety.

Third Embodiment

Hereinafter, a third embodiment of the present invention is described.

In the third embodiment, detection of abnormality that occurs in a cell system 10 (hereinafter referred to as "fail safe") is described.

Figure 4:
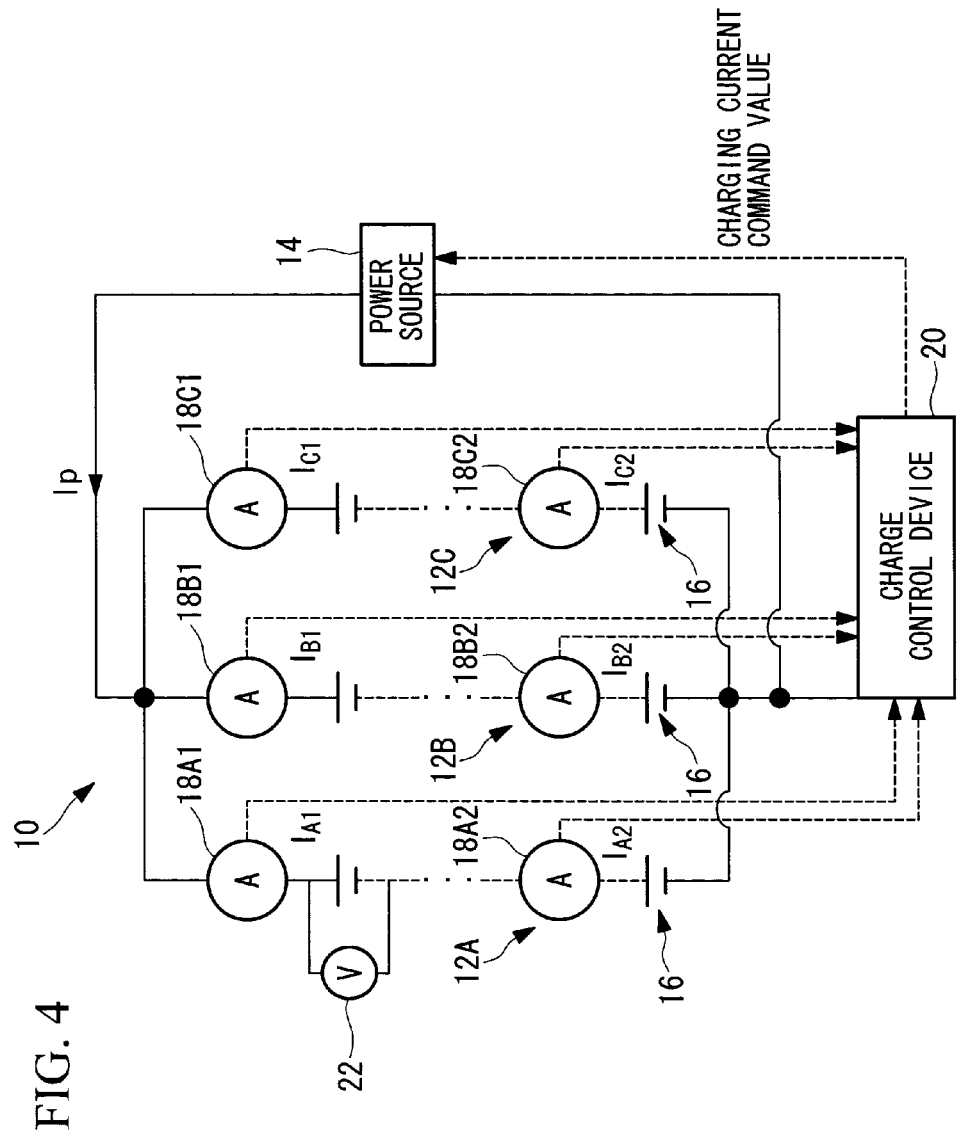
FIG. 4 is a block diagram of a cell system according to a third embodiment of the present invention.

FIG. 4 is a block diagram showing the cell system 10 according to the third embodiment of the present invention. Note that component members in FIG. 4 identical to those in FIG. 1 are designated by identical reference numerals to omit a description thereof. Since charge control processing according to the third embodiment is similar to the charge control processes according to the first and second embodiments, a description thereof is also omitted.

The cell system 10 according to the third embodiment includes a plurality of current sensors 18 provided in different positions for each of cell modules 12. For example, a cell module 12A includes current sensors 18A1 and 18A2, a cell module 12B includes current sensors 18B1 and 18B2, and a cell module 12C includes current sensors 18C1 and 18C2.

A charge control device 20 determines the presence or absence of abnormality that occurs in the cell system 10 based on a difference in detection results by a plurality of the current sensors 18 provided in each of the cell modules 12. As a consequence, the charge control device 20 can easily determine the presence or absence of abnormality that occurs in the cell system 10.

More specifically, the charge control device 20 determines occurrence of abnormality in the cell modules 12A and the like when, for example, a difference between a current value $I_{A1}$ detected by the current sensor 18A1 and a current value $I_{A2}$ detected by the current sensor 18A2 is equal to or more than a specified value α as shown in a following formula (1). Note that the specified value α is set in consideration of margin of errors in the current sensors 18.

Abnormality of the cell modules 12 is attributed to, for example, excessive increase in internal resistance of the secondary batteries 16, and the like.

$$|I_{x1} - I_{x2}| \geq \alpha \ (x=A,B,C) \tag{1}$$

When a current difference between the cell modules 12 becomes equal to or more than the specified value α, failure of the current sensors 18, abnormality of a bus and the like may possibly be occurring in addition to the abnormality of the cell modules 12. Thus, the abnormality that occurs in the cell system 10 is the abnormality in the cell modules 12, the current sensors 18 included in the cell modules 12, and the like.

The charge control device 20 determines the presence or absence of abnormality that occurs in the cell system 10 based on a difference in detection results in each of the cell modules 12 detected by the current sensors 18 as another form of fail safe. As a consequence, the charge control device 20 can easily determine the presence or absence of abnormality that occurs in the cell system 10. In the case of this configuration, the cell module 12 may include one current sensor 18.

More specifically, among a current value $I_{A1}$ detected by the current sensor 18A1, a current value $I_{B1}$ detected by the current sensor 18B1, and a current value $I_{C1}$ detected by the current sensor 18C1 for example, the charge control device 20 defines the largest current value as Imax, the second largest current value as Imid, and the third largest current value as Imin. The charge control device 20 determines the occurrence of abnormality in the cell system 10 when a difference between the current value Imax and the current value Imid is equal to or more than a specified value β, or when a difference between the current value Imid and the current value Imin is equal to or more than a specified value γ as shown in a following formula (2).

For example, when the current difference is equal to or more than the specified value β, it is determined that abnormality is occurring at least either the cell module 12A or the cell module 12B. When the current difference is equal to or more than the specified value γ, it is determined that abnormality is occurring at least either the cell module 12B or the cell module 12C. Note that the specified values β and γ are set in consideration of margin of errors in the current sensors 18.

$$I\max - I\mathrm{mid} \geq \beta \tag{2}$$

$$I\mathrm{mid} - I\min \geq \gamma \tag{3}$$

Note that when the current difference becomes equal to or more than the specified values β and γ, abnormality such as failure of the current sensors 18, abnormality of a bus, and the like, may possibly be occurring in addition to the abnormality of the cell modules 12 due to excessive increase in internal resistance of the secondary batteries 16.

As described in the foregoing, although the present invention has been described with use of each of the above-stated embodiments, the technical scope of the present invention is not limited to the scope disclosed in the embodiments. It should be understood that various changes or modifications may be added to each of the embodiments without deviating from the meaning of the present invention, and the changed or modified embodiments are also intended to be embraced in the technical scope of the present invention.

For example, although the cell system 10 configured to include three columns of the cell modules 12 connected in parallel has been described in each of the above-stated embodiments, the present invention is not limited to the configuration described, and the cell system 10 has only to include two or more columns of the cell modules 12 connected in parallel.

Moreover, the flow of charge control processing explained in each of the above described embodiments is merely illustrative, and therefore it is possible to delete an unnecessary step, to add a new step, and to change the processing order without being departed from the meaning of the present invention.

REFERENCE SIGNS LIST

10 Cell system
14 Power source

18 Current sensor
20 Charge control device
22 Voltage sensor

The invention claimed is:

1. A charge control device that controls a charging current to be supplied to a plurality of chargeable and dischargeable cell modules connected in parallel, wherein the charge control device performs:

a selecting operation that selects the maximum value as a maximum current value from current values detected by a current sensor provided in each of a plurality of the cell modules;

a comparing operation that compares the maximum current value which is selected with a reference current value predetermined as a maximum current value of the current to be supplied to the cell modules; and an increasing/decreasing operation that increases or decreases, on the basis of a comparison result of the comparing operation, the charging current to be supplied to a plurality of the cell modules by a predetermined specified value, wherein the charge control device repeatedly performs the selecting operation, the comparing operation and the increasing/decreasing operation until the maximum current value which is selected becomes the same value as the reference current value.

2. The charge control device according to claim 1, wherein when the maximum current value is less than the reference current value, the charging current is increased, whereas when the maximum current value exceeds the reference current value, the charging current is decreased.

3. The charge control device according to claim 1, wherein when at least one voltage value, detected by a voltage sensor that detects a voltage in each of secondary batteries that constitute the cell modules, has reached a predetermined first upper limit, the charging current to be supplied to the cell modules is controlled so that a maximum voltage value detected by the voltage sensor does not exceed a predetermined second upper limit.

4. The charge control device according to claim 3, wherein charging of the cell modules is ended based on the current values detected by the current sensors.

5. The charge control device according to claim 1, wherein a plurality of the current sensors are provided in different positions for each of the cell modules, and the presence or absence of abnormality is determined based on a difference in detection results by a plurality of the current sensors provided for each of the cell modules.

6. The charge control device according to claim 1, wherein the presence or absence of abnormality is determined based on a difference in detection results in each of the cell modules detected by the current sensor.

7. A cell system, comprising:

a plurality of chargeable and dischargeable cell modules connected in parallel;

a power source that supplies a charging current to a plurality of the cell modules;

a plurality of current sensors that detect the current in each of a plurality of the cell modules; and the charge control device according to claim 1.

8. A charge control method for controlling a charging current that is supplied to a plurality of chargeable and dischargeable cell modules connected in parallel, comprising:

a first step of selecting the maximum value as a maximum current value selected from current values detected by a current sensor in each of a plurality of the cell modules;

a second step of comparing the maximum current value which is selected with a reference current value predetermined as a maximum current value of the current to be supplied to the cell modules; and a third step of increasing or decreasing, on the basis of a comparison result of the second step, the charging current to be supplied to a plurality of the cell modules by a predetermined specified value, wherein the first step, the second step and the third step are repeatedly performed until the maximum current value which is selected becomes the same value as the reference current value.

* * * * *